Aug. 26, 1952 E. PETERSON 2,608,621

MAGNETIC RECORD DETECTOR

Filed Oct. 8, 1949 2 SHEETS—SHEET 1

INVENTOR
E. PETERSON
BY Harry C. Hart
ATTORNEY

Aug. 26, 1952 E. PETERSON 2,608,621

MAGNETIC RECORD DETECTOR

Filed Oct. 8, 1949 2 SHEETS—SHEET 2

INVENTOR
E. PETERSON
BY Harry C. Hart
ATTORNEY

Patented Aug. 26, 1952 2,608,621

UNITED STATES PATENT OFFICE 2,608,621

MAGNETIC RECORD DETECTOR

Eugene Peterson, New York, N. Y., assignor to Bell Telephone Laboratories, Incorporated, New York, N. Y., a corporation of New York Application October 8, 1949, Serial No. 120,395

12 Claims. (Cl. 179—100.2)

This invention relates to magnetometers for the detection of magnetic fields, and particularly to a pick-up for the detection of signals recorded in the form of irregularities in the magnetic condition of a magnetizable tape, wire, or sheet.

A principal object of the invention is to provide an output signal or indication of the presence of a magnetic field irregularity, such as the signal recorded on the magnetizable tape, which output signal is independent of the velocity of movement of the tape or other field-carrying medium with respect to the detecting apparatus. More specific objects are to improve the efficiency and certainty of operation of devices of this character, to minimize their magnetic reaction on the tape or other magnetic record, and to conserve operating power.

The more common forms of pick-up device for signals recorded on a magnetic tape are based on the principle that movement of such a tape in inductive relation with a conducting winding, and preferably in proximity with a small sensing gap in a ferromagnetic core, induces an electromotive force in the winding, which electromotive force can then be utilized as an indication of the record. Such indications, however, are closely proportional in magnitude to the speed of movement of the tape. This requires, for good reproduction, great constancy of speed of tape movement and has the further consequence that, if it be desired to examine a particular portion of the message in detail by greatly reducing the speed of the tape, the indicated output of the device becomes so small as to be useless, being indeed, identically zero when the tape movement is completely halted.

It is possible to avoid these defects of the common magnetic tape pick-up by making use of the principle of the so-called "magnetic amplifier" as described, for example, in "Electronics" for September 1948, at page 89. In the conventional magnetic amplifier, a core of saturable ferromagnetic material is provided with an exciting winding which carries a current which is normally of constant amplitude and of relatively high frequency, and an input signal winding which carries the signal current to be amplified. The magnetic flux induced in the core by the current in the input winding biases the core to an unsymmetrical state, whereupon currents flow in the windings which are even-order harmonics of the exciting current, and these currents are utilized as the output of the device. Because the power associated with these output currents may exceed the magnitude of the signal input power, the device has come to be known as a magnetic amplifier. To adapt this device to use as a pick-up from tape, the input winding is removed and one leg of the core is provided with an air-gap, in close proximity to which the magnetized tape is placed. It acts to induce a field in the air-gap which modifies the saturation of the core. Exciting windings are provided, as before, and supplied with a high frequency exciting current. From these windings an output signal may be derived which is zero when the magnetic fluxes in the air-gap due to the exciting windings are balanced, i. e., in the absence of any disturbing magnetic force in the air-gap. When, however, the magnetic field in the air-gap is disturbed by the proximity of an external magnetic agent such as an irregularity in the magnetic condition of a record-bearing tape, the even-order harmonic currents derived from the windings rise to value, positive or negative, which is in substantial proportion to the strength of the magnetic pole on the tape record. Moreover, these currents, which may be employed to drive a sound reproducer, to operate selective switches or for any other desired purpose, are entirely independent of the speed of movement of the tape.

It is a feature of the invention that, by virtue of the form and construction of the core, the magnetic flux due to the exciting winding is wholly contained within the ferromagnetic material of the core. In other words, there are substantially no stray magnetic fields. As a result, any tendency of the magnetic field due to the exciting winding to demagnetize the tape record is substantially eliminated.

It is another feature of the invention that the magnetic field due to the exciting winding, while it is substantially balanced for no field in the sensing gap, is of substantial strength in other parts of the core and follows a closed path which lies entirely within the ferromagnetic material. With materials of suitably high permeability, many of which are now available, the magnetic reluctance of a closed path is very low, so that the strong flux may be maintained with the expenditure of only a small amount of power in the exciting winding.

The invention will be fully apprehended from the following detailed description of preferred embodiments thereof, taken in connection with the appended drawings in which.

Figure 1:
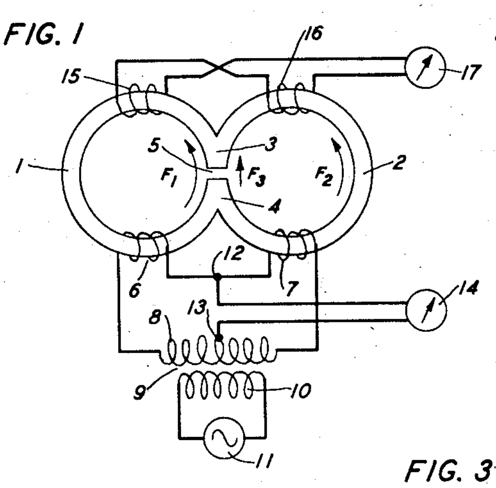
Figs. 1, 2 and 3 are schematic circuit diagrams illustrating the principles of operation of the invention as implemented by various external circuit configurations.

Referring now to the figures, Fig. 1 shows a core of saturable ferromagnetic material of two nearly closed loops, 1, 2, having common portions 3, 4, between which there is a gap 5 in or close to which the magnetic field or element to be detected may be placed; and, when the core is in any way magnetized, the core faces which bound the gap become magnetic poles. Windings 6, 7 link the loops and are connected together in series with the secondary winding 8 of a transformer 9. The primary winding 10 of the transformer is driven by any suitable source of high frequency voltage here illustrated as an oscillator 11.

The windings 6, 7 are so poled and connected that when current is supplied to them from the source 11 by way of the transformer 9, magnetic fluxes are generated in the two loops which are alike in magnitude and phase, and in the same angular direction as indicated by the arrows $F_1$ and $F_2$. As a result, the flux in the air-gap 5, which is evidently equal to the difference between the fluxes $F_1$ and $F_2$, is zero in the absence of a disturbing force due to an external magnetic influence.

Now when the balance of the fluxes $F_1$ and $F_2$ is disturbed by bringing a magnetic pole such as a portion of a magnetized record tape close to the air-gap 5, a small additional flux component $F_3$ arises in a direction from one part of the common portion 3, 4, of the core to the other. This flux evidently adds to the flux $F_1$ and subtracts from the flux $F_2$ or vice versa, thereby giving rise to an increased voltage drop across one winding, e. g., the left-hand winding 6 and to a reduced voltage drop across the other winding, e. g., right-hand winding 7. As a result, the common point 12 of the two windings changes its potential with respect to the mid-point 13 of the transformer secondary winding 8, and the resulting voltage drop serves as an indication of the presence and magnitude of the tape record or other disturbance and actuates a meter 14.

If preferred, additional windings 15, 16 may be provided, one linked by the flux $F_1$ in the core loop 1, and the other linked by the flux $F_2$ in the loop 2. In the absence of a disturbance these fluxes are alike so that, when the windings 15, 16 are cross-connected as shown, the voltages induced in them are balanced. When, however, a disturbance causes the flux $F_3$ to arise, adding to the flux $F_1$ and subtracting from the flux $F_2$, the generated electromotive forces in these windings 15, 16 become unbalanced and an indication appears on a meter 17.

Figure 2:
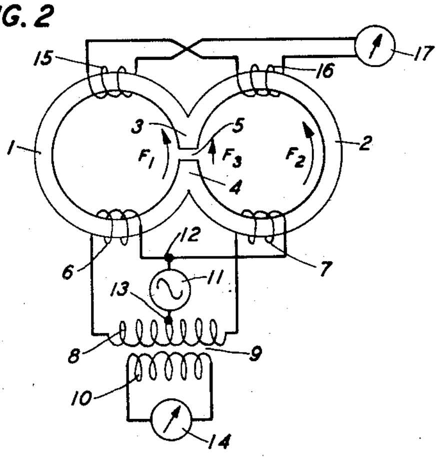

The principal requirements illustrated by Fig. 1 may equally well be met by a change in the circuit arrangement as shown in Fig. 2. Here the location of the exciting source 11 and of the indication meter 14 are interchanged, the source 11 being applied between the common point 12 of the two exciting windings 6, 7 and the mid-point of the winding 8 of the transformer 9, whereas the indicator 14 is connected to the winding 10 of the transformer 9. Thus, the exciting windings 6, 7 are in parallel from the standpoint of the exciting source 11 and, in order that they shall generate fluxes $F_1$ and $F_2$ having the relations described above, one or other of the windings must be reversed in polarity as compared with Fig. 1 in the manner indicated. As before, the output may be taken if preferred from output windings 15, 16 which are cross-connected as described above in connection with Fig. 1 and which actuate a meter 17 in the same way.

Figure 3:
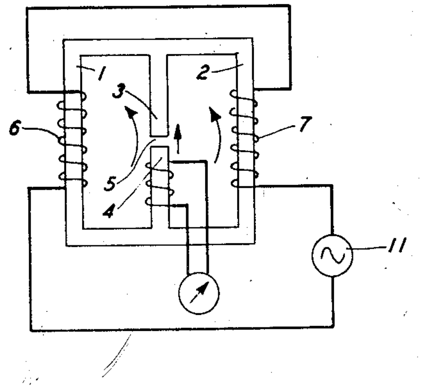

In Figs. 1 and 2 the output indication is based on the difference between the generated electromotive forces in the windings on the two loops, whether this output be taken from the upper windings 15, 16 which serve for output only, or from the lower windings 6, 7 which also serve for excitation. Under some circumstances, an indication which is based on a small difference between two large quantities is unreliable; and if preferred, the output may be derived directly from the flux $F_3$ generated by the external disturbance. Thus, an output winding may be placed on one of the common portions 3, 4 of the core structure as indicated in Fig. 3 which may be elongated to support such a winding to the extent desired. By way of example the transformer 9 is here omitted, the exciting source 11 being connected directly to the windings 6, 7.

Any of the foregoing core structures may of course have rectangular forms as indicated in Fig. 3 if for any reason such a retangular form is preferred to the double-annulus core form of Figs. 1 and 2.

Figure 4:
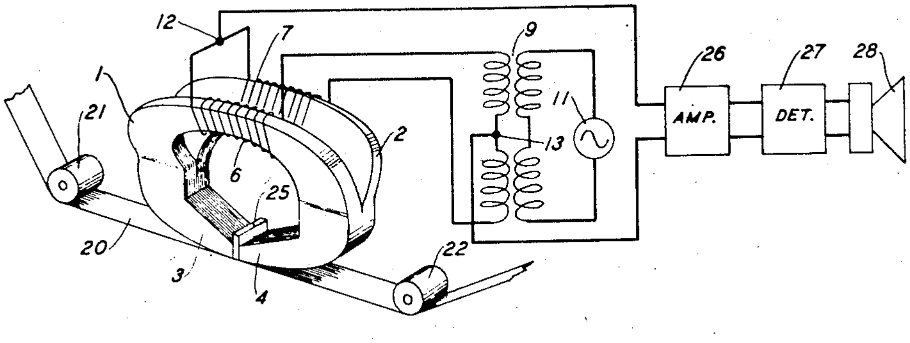
Fig. 4 is a circuit diagram, partly schematic and partly structural, showing a tape record reproducer according to the invention and including a core structure of one appropriate form.

Fig. 4 shows a reproducer system in accordance with the invention. Here the tape 20 may be thought of as bearing a recorded signal in the form of minute irregularities of its longitudinal magnetization. The core structure itself may comprise an upper portion and a lower portion, of which the upper portion comprises two approximately semicircular parts 1, 2, magnetically integral at their ends which may be machined to present a smooth surface, while the lower portion comprises another approximately semicircular part 3, 4 having a narrow "air-gap" 5, which, in accordance with standard practice, may be provided with a spacer 25 of brass or other non-magnetic material. All three semicircular parts are preferably constructed of precut laminations. The length of the gap 5 in the direction of the tape length should be small compared to a magnetization wavelength of the tape. The tape 20 may be driven by conventional means not shown and may be guided, as by rollers 21, 22 past the gap in a fashion to ride over the mechanically smooth surface presented by the ends of the opposite parts 3, 4 of the lower half loop and the non-magnetic spacer 25 between them. The electric network selected by way of illustration to complete the system is essentially that of the lower part of Fig. 1. Each half 1, 2, of the upper portion of the core bears a coil, and these coils 6, 7 are connected in series and supplied by way of a transformer 9 from an excitation source 11 of suitably high frequency. The coils 6, 7 are wound in the sense of Fig. 1, i. e., so that the flux generated by each one in the sensing gap 5 is opposed to and balanced by that generated in the other. The output circuit is tapped between the common point 12 of the coils and a center tap 13 on the secondary winding of the transformer 9. It may include an amplifier 26, a detector 27 and a reproducer 28. The well-known mode of operation of magnetic amplifiers includes the fact that the useful output of a device such as the present one comprises even-order harmonics of the exciting source, modulated by the input signal which is here in the form of irregularities in the magnetization of the tape. Accordingly, the amplifier 26 should have an appropriate frequency range, and the modulating signal may be removed for application to the reproducer 28 by a detector 27. Variants of this illustrative arrangement are of course possible.

Figure 5:
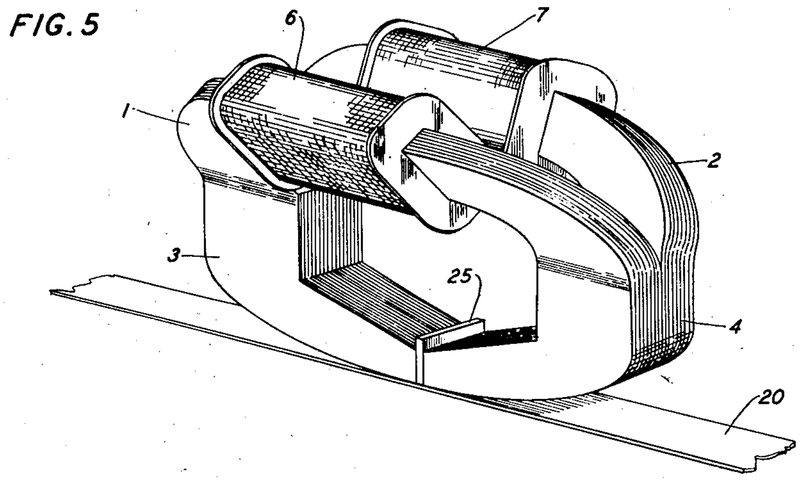
Figs. 5, 6 and 7 are perspective illustrations of possible variations of the core structures of Fig. 4.

The core of Fig. 4 may, if preferred, be constructed in the manner illustrated in Fig. 5. Here individual laminations, each of which is a nearly closed magnetic loop having a short air-gap, are bent through a dihedral angle coinciding approximately with a diameter. The angle may be of the order of 120 degrees. A number of such laminations are nested together to form the left-hand half of the complete core structure and an equal number are similarly nested to form the right-hand half. The half cores thus formed may be individually wound with coils and then brought together with their gaps in lateral alignment, to form the complete unitary core structure illustrated.

Figure 6:
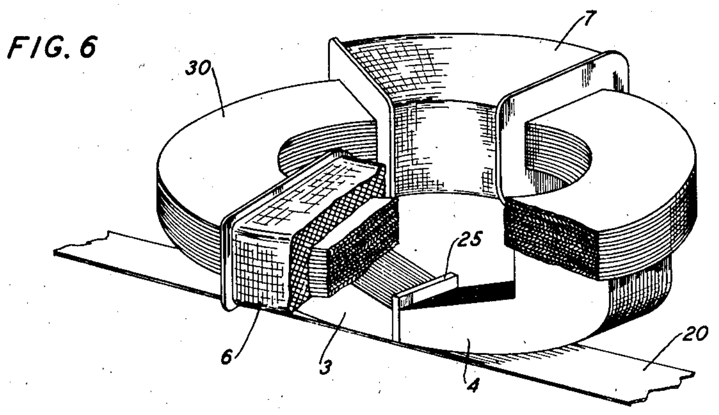

Fig. 6 illustrates another alternative structure. Here the lower portion of the structure may be the same as in Fig. 4, i. e., an approximately semi-circular pile of laminations containing the air-gap spacer 25. The upper portion may be a pile 30 of annular laminations which is prewound with a pair of coils 6, 7 centered approximately at opposite ends of a diameter. The upper member is then placed in contact with the machined upper faces of the lower member, and the core structure is complete, the lower member lying in a plane normal to the plane of the upper member.

Figure 7:
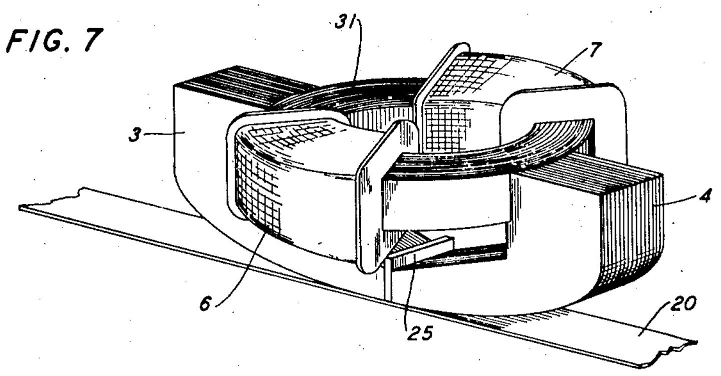

Fig. 7 illustrates still another alternative structure. Here the upper member may be a coil 31 of ferromagnetic tape, wound with diametrically opposite coils 6, 7 of wire as in the case of Fig. 6. The lower member may be the same as in the case of Figs. 4 and 6 with the exception that the inner faces of the upper ends 3, 4 of the lower member are preferably machined to the same radius as the outer turn of the spiraled tape 31 to provide a snug, low reluctance fit. The tape spiral 31 may be wound to an outer diameter slightly in excess of the machined inner diameter of the upper ends of the lower member. Upon slight diametral compression it may be easily slipped into place where it remains, by reason of its own elastic outward pressure, until removed. If preferred, a tape coil such as that of Fig. 7, and of diameter comparable with the outer diameter of the annular member of Fig. 6, may be mounted on the upper ends of the lower member as in Fig. 6.

Still other variants of the foregoing illustrative structures will occur to those skilled in the art.

What is claimed is:

1. A magnetometer comprising a core of ferromagnetic material formed into two loops having a common gap, a first exciting winding linking one of said loops exclusively, a second exciting winding linking a second one of said loops exclusively, said windings having substantially equal numbers of turns, a constant-frequency source of magnetizing current connected to said windings, and means comprising said current source and said windings together for producing fluxes in said loops which are alike in magnitude and which are oppositely directed in said gap.

2. In combination with apparatus as defined in claim 1, means for deriving the potential of an electromotive force generated by unbalance of the fluxes in said gap by an external agent.

3. A magnetometer comprising a core of ferromagnetic material formed into two loops having a common gap, a first winding linking one of said loops exclusively, a second winding linking the other of said loops exclusively, a source of a magnetizing current, and a current-responsive indicator, said windings being connected in series to said source and in parallel to said indicator.

4. Apparatus as defined in claim 2 wherein said potential-deriving means comprises a third winding linking the first of said loops exclusively, a fourth winding linking the second of said loops exclusively, and a current-responsive device, said third and fourth windings being connected in series opposition to said current-responsive device.

5. Apparatus as defined in claim 2, wherein said first and second windings are connected in series to said magnetizing current source and wherein said potential-deriving means comprises a third winding linking both of said loops adjacent said gap, and a current-responsive device connected to said third winding.

6. In combination with an extended element of magnetizable material on which signals are recorded in the form of magnetic irregularities, apparatus for reproducing said signal which comprises a core of ferromagnetic material formed into two loops having a common gap, windings linking said loops, a source of a magnetizing current connected to said windings, said windings being so poled with respect to said source as to produce fluxes in said loops which are alike in magnitude and in angular direction and which are balanced in said gap, means for guiding said extended medium past said gap and in close proximity therewith, a reproducer, and connections for applying to said reproducer a potential derived from unbalanced electromotive forces generated in said windings.

7. Magnetic record reproduction apparatus which comprises a core of ferromagnetic material formed into two loops having common portions and separate portions, said loops providing flux paths which are substantially coincident throughout a part of their lengths defined by said common portion and substantially separated throughout other parts defined by said separate portions, said common portion having a gap therein, a winding linking each of said separate loop portions, an excitation source connected to said windings in a sense to generate fluxes in said loops which are balanced in said gap, an extended magnetic record-bearing member, means for guiding said member past said gap and adjacent thereto in a fashion to generate in said loops a flux which aids the excitation flux in one loop and opposes it in the other loop, thereby to generate unbalanced electromotive forces in said windings, and means for indicating such unbalanced electromotive forces.

8. A record reproducer as defined in claim 7 wherein the common portion of the two loops lies in a plane which is angularly spaced by less than 180 degrees from a plane containing one of the separate portions.

9. A record reproducer as defined in claim 7 wherein the planes containing the common portion and the separate portions are mutually angularly spaced by approximately 120 degrees.

10. Apparatus as defined in claim 1 wherein the two loops of ferromagnetic material have common portions containing the common gap and separate portions, and wherein the planes containing the common portion and the separate portions are mutually angularly spaced by approximately 120 degrees.

11. Apparatus as defined in claim 1 wherein the two loops of ferromagnetic material have common portions containing the common gap and separate portions, and wherein the separate portions lie in a first plane and the common portions lie in a second plane approximately normal to the first plane.

12. Apparatus as defined in claim 1 wherein the two loops of ferromagnetic material have common portions containing the common gap and separate portions, and wherein the separate portions of the two loops are constituted of the two halves of a single spiral of magnetizable tape, the outer diameter of which is snugly embraced between the free upper ends of the common portion.

EUGENE PETERSON.

REFERENCES CITED

The following references are of record in the file of this patent:

UNITED STATES PATENTS

| Number | Name | Date |
|---|---|---|
| 2,351,595 | Bindschedler | June 20, 1944 |
| 2,440,575 | Dedek | Apr. 27, 1948 |
| 2,476,110 | Neufeld | July 12, 1949 |
| 2,509,500 | Howey | May 30, 1950 |
| 2,536,260 | Burns | Jan. 2, 1951 |